United States Patent
Cur et al.

(10) Patent No.: US 9,803,898 B2
(45) Date of Patent: Oct. 31, 2017

(54) AIR CONDITIONER WITH SELECTABLE SUPPLEMENTAL COMPRESSOR COOLING

(71) Applicant: Whirlpool Corporation, Benton Harbor, MI (US)

(72) Inventors: Nihat O. Cur, St. Joseph, MI (US); Steven John Kuehl, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 188 days.

(21) Appl. No.: 14/580,736

(22) Filed: Dec. 23, 2014

(65) Prior Publication Data

US 2015/0354838 A1    Dec. 10, 2015

Related U.S. Application Data

(60) Provisional application No. 62/010,088, filed on Jun. 10, 2014, provisional application No. 62/064,181, filed on Oct. 15, 2014.

(51) Int. Cl.
*F24F 1/00*    (2011.01)
*F24F 1/06*    (2011.01)
(Continued)

(52) U.S. Cl.
CPC .......... *F25B 39/00* (2013.01); *B01D 46/0023* (2013.01); *B01D 46/0028* (2013.01);
(Continued)

(58) Field of Classification Search
CPC ....... F24F 1/38; F24F 1/48; F24F 1/56; F25B 31/006; F25D 23/003; B05B 3/105; F04D 29/326
See application file for complete search history.

(56) References Cited

U.S. PATENT DOCUMENTS 3,403,529 A * 10/1968 Reber, Jr ................ F25D 21/14
                                                    62/277
3,872,684 A *  3/1975 Scott ....................... F25B 39/04
                                                    62/181
(Continued)

FOREIGN PATENT DOCUMENTS

DE      3727672 C     7/1988
DE      3706220 C1    9/1988
(Continued)

OTHER PUBLICATIONS

International Search Report and the Written Opinion, dated Oct. 22, 2015, 13 pages.
(Continued)

*Primary Examiner* — Christopher R Zerphey
(74) *Attorney, Agent, or Firm* — Nyemaster Goode, P.C.

(57) ABSTRACT

An outdoor unit (ODU) for an air conditioning system includes a baffle or other airflow direction control such that the cooling air from a condenser is at least partially directed over the compressor to provide air movement around the compressor to assist in thermal transfer of heat from the compressor. In one system, curvilinear frustoconical baffles are positioned in a conventional barrel-type outdoor unit to direct airflow toward the compressor before being discharged from the unit. When any of the ODUs is part of a heat pump system for providing heating and cooling, a retractable or movable air diverting system is employed when in the heating mode to prevent airflow through the condenser from reaching the compressor.

19 Claims, 12 Drawing Sheets

(51) Int. Cl.

| | | |
|---|---|---|
| *F24F 1/38* | (2011.01) | |
| *F24F 1/48* | (2011.01) | |
| *F24F 1/56* | (2011.01) | |
| *F25B 39/00* | (2006.01) | |
| *B01D 46/00* | (2006.01) | |
| *B01D 46/30* | (2006.01) | |
| *F25B 49/00* | (2006.01) | |
| *F24F 1/10* | (2011.01) | |
| *F25B 39/02* | (2006.01) | |

(52) U.S. Cl.
CPC ......... *B01D 46/0032* (2013.01); *B01D 46/30* (2013.01); *F24F 1/0003* (2013.01); *F24F 1/06* (2013.01); *F24F 1/10* (2013.01); *F24F 1/38* (2013.01); *F24F 1/48* (2013.01); *F24F 1/56* (2013.01); *F25B 49/00* (2013.01); *F25B 39/02* (2013.01)

(56) References Cited

U.S. PATENT DOCUMENTS

| | | | |
|---|---|---|---|
| 4,505,129 A | | 3/1985 | Yamane et al. |
| 4,522,040 A | * | 6/1985 | Ochiai .................. F25D 23/003 62/419 |
| 4,538,425 A | * | 9/1985 | Ohishi .................... F24F 1/027 62/272 |
| 4,970,874 A | * | 11/1990 | Solak ....................... F25D 23/00 312/116 |
| 5,215,441 A | * | 6/1993 | Evans .................. F04D 29/384 416/223 R |
| 5,372,189 A | * | 12/1994 | Tsunekawa ............. F24F 1/027 165/59 |
| 6,532,757 B2 | * | 3/2003 | Holzer ................... A47B 77/08 62/259.1 |
| 6,658,882 B2 | * | 12/2003 | Ohama .................. F24F 13/06 415/208.1 |
| 6,913,637 B2 | | 7/2005 | Kim |
| 7,266,971 B2 | | 9/2007 | Kang |
| 7,350,371 B2 | | 4/2008 | Lee et al. |
| 2006/0037356 A1 | * | 2/2006 | Ahn .......................... F28F 9/26 62/507 |
| 2009/0193831 A1 | * | 8/2009 | Kim ...................... F04D 29/526 62/259.1 |
| 2011/0000653 A1 | * | 1/2011 | Nakagawa ................ F24F 1/38 165/121 |
| 2015/0204599 A1 | * | 7/2015 | Chisaki .................... F24F 1/06 62/426 |

FOREIGN PATENT DOCUMENTS

| | | |
|---|---|---|
| EP | 2423614 A1 | 2/2012 |
| EP | 2518418 A1 | 10/2012 |
| EP | 2597384 | 5/2013 |
| JP | 61049943 A | 3/1986 |
| JP | 03036434 | 2/1991 |
| JP | H0634153 A | 2/1994 |
| JP | 11-276835 | 10/1999 |
| JP | 2000018646 | 1/2000 |
| JP | 2000055424 A | 2/2000 |
| JP | 2005180768 | 7/2005 |
| JP | 2005315531 | 11/2005 |
| JP | 2005315531 A | 11/2005 |
| JP | 2006002985 | 1/2006 |
| KR | 0100176907 | 10/1999 |
| KR | 20000046491 | 7/2000 |
| KR | 1020050058136 | 6/2005 |
| KR | 100626433 | 9/2006 |
| KR | 100626433 B1 | 9/2006 |
| KR | 0100715335 B1 | 5/2007 |
| KR | 0100715337 B1 | 5/2007 |
| KR | 1020090081913 A | 7/2009 |

OTHER PUBLICATIONS

International Search Report and Written Opinion, dated Dec. 3, 2015, 14 pages.

* cited by examiner

AIR CONDITIONER WITH SELECTABLE SUPPLEMENTAL COMPRESSOR COOLING

CROSS-REFERENCE TO RELATED APPLICATION

This application claims the benefit of U.S. Provisional Patent Application No. 62/010,088, entitled SPLIT SYSTEM OUTDOOR AIR UNIT, filed on Jun. 10, 2014, and U.S. Provisional Patent Application No. 62/064,181, entitled SPLIT SYSTEM AIR CONDITIONER/HEAT PUMP WITH DUAL HUB FAN CONDENSING UNIT AND ENHANCED COMPRESSOR COOLING, filed on Oct. 15, 2014, the disclosures of which are hereby incorporated by reference in their entirety.

BACKGROUND

The present invention relates to an outdoor unit of an air conditioner system in which cooling air for the condenser unit can be selectably directed toward the compressor to provide supplemental cooling of the compressor during cooling operation of the unit. If installed in a heat pump system, when in a heating mode, the airflow is selectably blocked.

In outdoor air conditioning units (ODU), typically a fan draws air inwardly through the condenser coils, which air is exhausted outwardly (typically upwardly in a barrel-type system) to the ambient air. Since the fan is usually located at the top, the compressor, which is also housed in the same cabinet, receives only incidental air movement for cooling, relying instead upon convection into the air stream of the condenser cooling airflow.

As the demand for energy efficiency increases, as does the awareness of overall energy usage, air conditioning units have begun using larger outdoor units to provide relatively large condensers (as well as evaporators located in the furnace) to reduce electrical usage. Although providing higher efficiency than conventional units a few years old, the newer units are relatively large and somewhat unsightly, require more material to fabricate, are more difficult to install due to their size, and are more expensive as an initial investment.

There exists a need, therefore, for a high efficiency air conditioning system which is relatively compact compared to the present day high efficiency units.

SUMMARY OF THE INVENTION

The present invention addresses this need by providing a system in which a baffle or some other airflow direction is provided such that the cooling air exhausted air from the condenser is at least partially directed over the compressor to provide air movement around the compressor to assist in thermal transfer of heat from the compressor.

In one embodiment of the invention, an outdoor unit (ODU) includes a cabinet in which a compressor is located in a separate ventilated compartment adjacent the fan and condenser. In this embodiment, a baffle is positioned on the output airflow of the condenser section and directed into the cabinet of the compressor for providing airflow around the compressor. In another embodiment, the condenser and the compressor are mounted in the same cabinet, and the flow of cooling air passes through the condenser and is then directed over the compressor. Other embodiments employ centrifugal fans for moving air around the compressor.

In yet another embodiment of the invention, one or more airflow curvilinear frustoconical baffles are positioned in a conventional barrel-type outdoor unit in which the compressor is located centrally within a surrounding condenser. A fan moves air through the condenser and the baffle is positioned intermediate the compressor and the condenser to direct airflow toward the compressor before being discharged from the unit. When any of the ODUs are part of a heat pump system for providing heating and cooling, a retractable or movable air diverting system is employed when in the heating mode to prevent airflow through the condenser from reaching the compressor.

In any of the embodiments, the diverting or directing of airflow, which is typically exhausted to the atmosphere, is, at least in part, diverted over the compressor to greatly increase the efficiency of the unit.

These and other features, advantages, and objects of the present disclosure will be further understood and appreciated by those skilled in the art by reference to the following specification, claims, and appended drawings.

BRIEF DESCRIPTION OF THE DRAWINGS

The foregoing summary, as well as the following detailed description of the disclosure, will be better understood when read in conjunction with the appended drawings. For the purpose of illustrating the disclosure, there are shown in the drawings, certain aspect(s) which are presently preferred. It should be understood, however, that the disclosure is not limited to the precise arrangements and instrumentalities shown. Drawings are not necessarily to scale, but relative special relationships are shown and the drawings may be to scale especially where indicated. As such, in the description or as would be apparent to those skilled in the art, certain features of the disclosure may be exaggerated in scale or shown in schematic form in the interest of clarity and conciseness.

DETAILED DESCRIPTION

Before the subject disclosure is described further, it is to be understood that the disclosure is not limited to the particular aspects of the disclosure described below, as variations of the particular aspects may be made and still fall within the scope of the appended claims. It is also to be understood that the terminology employed is for the purpose of describing particular aspects, and is not intended to be limiting. Instead, the scope of the present disclosure will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure.

Figure 1:
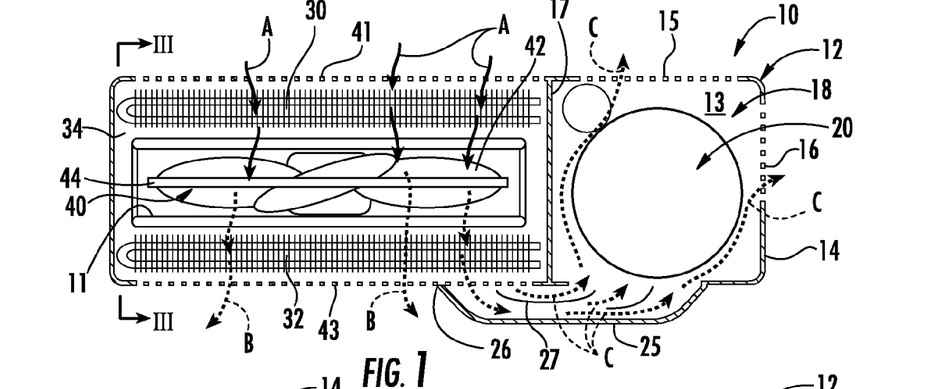
FIG. 1 is a top plan view in schematic form of a first embodiment of the present invention.
Figure 2:
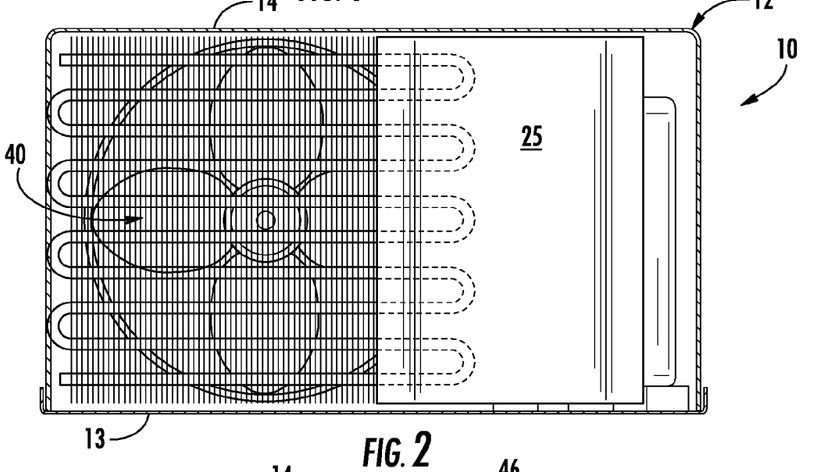
FIG. 2 is a front elevational view of the structure shown in FIG. 1.
Figure 3:
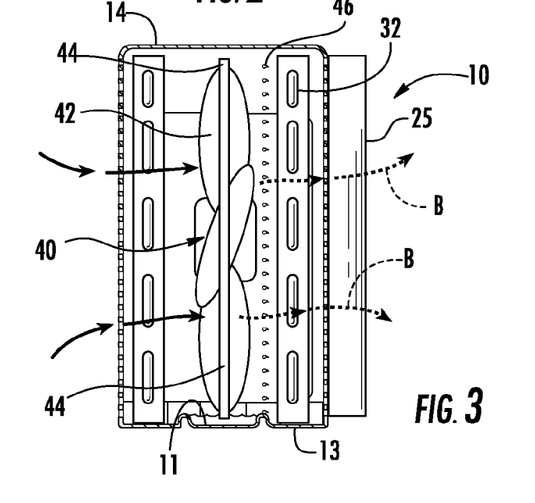
FIG. 3 is a cross-sectional view of the structure shown in FIGS. 1 and 2, taken along section line III-III in FIG. 1.

Referring initially to FIGS. 1-3, there is shown an air conditioner outdoor unit (ODU) 10, which is coupled to an evaporator within a furnace or indoor unit housing within a building by a conventional high pressure liquid supply line and low pressure gas return line. The outdoor unit (ODU) 10 includes a cabinet 12 housing a compressor 20 which receives a low pressure gas from the evaporator, compressing it to a high pressure gas which is then supplied to the condenser, which is in the form of two sections 30 and 32 split on opposite sides of the housing 12 with a fan assembly 40 between them. In all embodiments, the condenser, if in two sections, can be coupled in a parallel refrigerant flow path. Alternatively, they can be coupled in series and operated in a manner described with reference to the description of FIGS. 13-16 described below. The condenser condenses the high pressure gas to a high pressure liquid which generates a significant amount of heat which must be dissipated in the ODU, typically by movement of air through finned condenser coils using fan assembly 40. In the embodiment shown in FIGS. 1-3, the fan assembly 40 is centered between two finned condenser coils 30, 32, which are serially coupled in the circuit. Subsequently, the high pressure liquid is returned to the evaporator through a capillary tube or other conventional expansion device means. The condensers 30, 32 in this embodiment, as well as the condenser(s) in the remaining embodiments, are conventionally coupled in the refrigerant flow path, including compressor 20 and an associated evaporator using conventional tubing and gastight fittings.

The cabinet 12 has a top enclosing panel 14 and a bottom or floor enclosing panel 13 and is divided by a vertical partition 17 into a first section 13 defining a compressor chamber 18 which encloses the compressor 20. Chamber 18 includes vent grills 15, 16 on at least two sides of the cabinet to vent air flowing through the chamber 18. The cabinet includes an enclosed top 14 and a condenser compartment 34 adjacent the compressor compartment 18 and separated by the partition wall 17. Compartment 34 houses the finned condensers 30, 32 in a vertical configuration with the fan assembly 40, which includes a motor-driven fan with a plurality of blades 42. An outer rim 44 is coupled to the tips of blades 42 and engages a water tray 11 in the floor 13 (FIG. 3) of cabinet 12. Tray 11 is filled with water by the condensate collected during the dehumidification of the indoor conditioned air that is provided by the indoor unit evaporator coil, or via a suitable water supply and float valve arrangement, such that, it is always supplying water to the rim 44 in a sling fan arrangement of well-known design. One design, for example, is shown in expired U.S. Pat. No. 5,215,441, the disclosure of which is incorporated herein by reference. As the fan assembly 40 rotates, water is picked up by the rim 44 and water droplets 46 are projected by the airflow generated by rotating blades 42 toward the secondary finned condenser coils 32 to provide additional cooling to the ODU and particularly to the condenser coils 32.

In this embodiment, the input air, as represented by arrows A, is drawn in through inlet air grill 41 by fan assembly 40 and discharged in a direction indicated by arrow B through the finned condenser coil 32. An air deflecting baffle 25 is formed with the cabinet 12 and defines an air plenum 27 with an open mouth 26 which partially extends over the discharge grill 43 of the cabinet 12. Thus, at least a partial amount of the airflow through the condensers 30, 32 is diverted by the baffle 25, as indicated by arrows C, into the condenser chamber 18. The air then flows around the compressor 20, as illustrated by arrows C, to provide supplemental cooling for the compressor 20.

In the embodiment shown, the baffle 25 extends from the top to the bottom of the cabinet 12, as seen in FIGS. 2 and 3, and, as seen in FIG. 1, overlies and scoops air from approximately 25% of the discharge grill 43 of the ODU. Although the air exiting the second finned condenser coil 32 is heated, it is significantly cooler than the outer surface of compressor 20. By diverting a portion of the airflow indicated by arrows C in the figures, significant additional cooling to the compressor 20 is provided, resulting in some installations of an increased efficiency of nearly 10%. This allows a smaller and less expensive ODU 10 to be employed at an installation due to the improved efficiency.

In this and the remaining embodiments, the airflow to the compressor typically will be turbulent with a flow rate that will vary depending upon the design. In the first embodiment where the fan assembly 40 provides a flow of about 1000 cubic feet per minute (CFM), a 200-300 CFM flow is diverted to compressor 20. The temperature of the compressor outer surface can range from 150° F.-170° F. or even more. The temperature of air diverted to the compressor or directed onto the compressor by all of the embodiments will typically be in the ambient air temperature plus about 10° F. Thus, for an outside air temperature of 95° F. and a compressor temperature of 170° F., a flow rate of from 200-1000 CFM of air, which is 65° F. ($\Delta$T) cooler than the compressor 20 flows over the compressor assisting in cooling the compressor, which is thermodynamically known to increase system operating efficiency.

Figure 4:
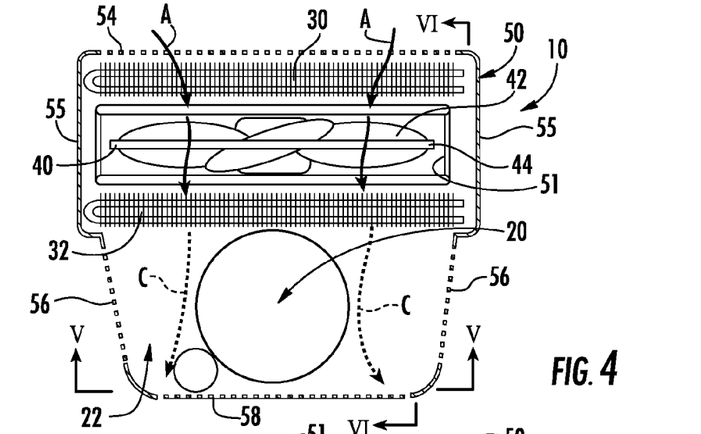
FIG. 4 is a top plan view shown in schematic form of a second embodiment of the present invention.
Figure 5:
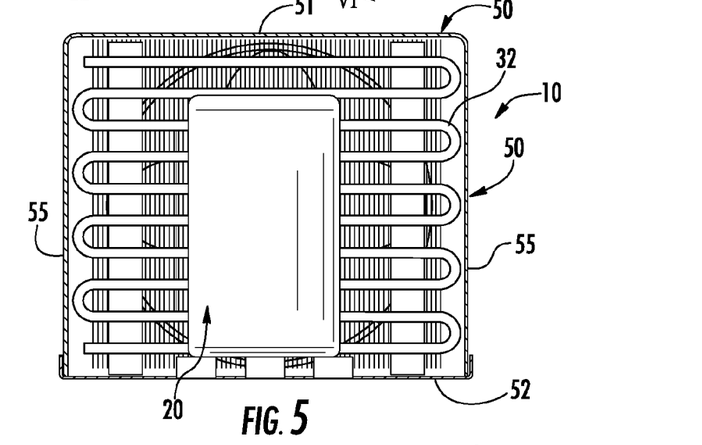
FIG. 5 is a cross-sectional view of the structure shown in FIG. 4, taken along section line V-V of FIG. 4.
Figure 6:
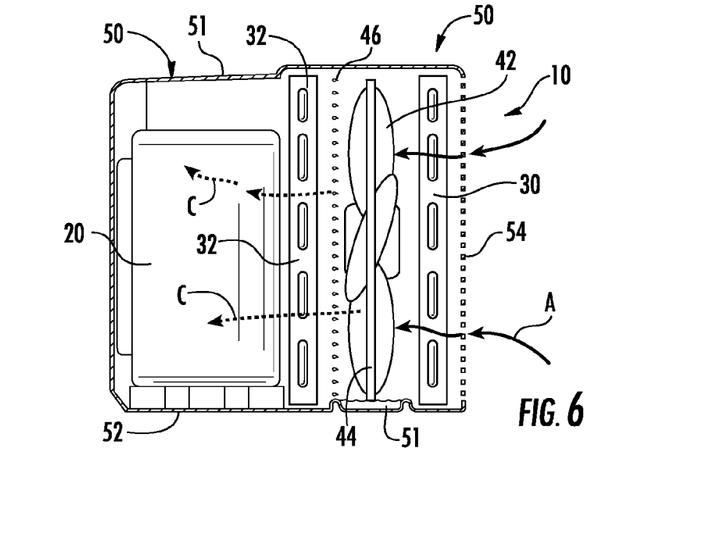
FIG. 6 is a cross-sectional view of the structure shown in FIGS. 4 and 5, taken along section line VI-VI of FIG. 4.

Referring now to FIGS. 4-6, an alternative embodiment of the invention is disclosed in which an ODU 10 includes an integrated cabinet 50 which includes both the compressor 20 and split finned condenser coils 30, 32 with a fan assembly 40 positioned between the condensers. Fan assembly 40, as in the first embodiment, includes a motor-driven fan having blades 42 with an integral rim 44 that is exposed to water in a tray 51 (FIG. 6) in the floor 52 of the cabinet 50. Cabinet 50 includes airflow grills 54 on the inlet side and on the outlet sides 56 of the compressor chamber 22 as well as an exit air grill 58. Thus, incoming cooling air, indicated by arrows A, passes through the first and second condenser driven by the motorized fan assembly 40 and flows around the compressor 20 exiting the ODU, as indicated by arrows C, both through the side grills 56 and the exit air grill 58. Again, the water tray 51 provides water droplets 46, which are driven by the fan blades 42 onto the condenser section 32, providing additional cooling within the condenser coils 32 with the flow of air C exiting through the ODU grill 58 to provide supplemental cooling for condenser 20. The top 53 and sides 55 of the cabinet are enclosed to promote the horizontal airflow indicated by the arrows.

Figure 7:
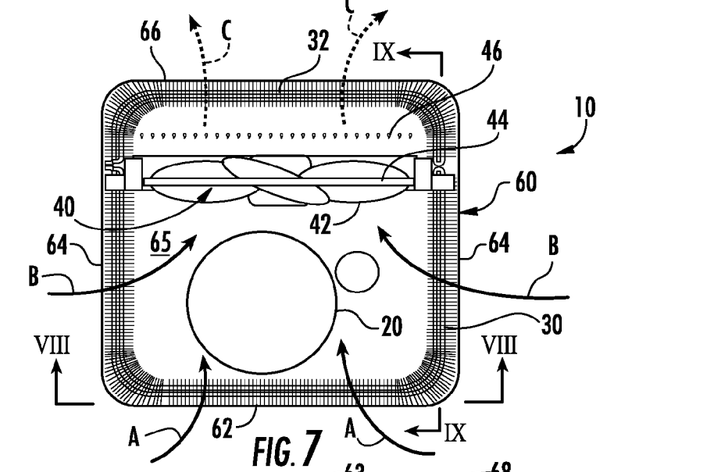
FIG. 7 is a top plan schematic view of a third embodiment of the present invention.
Figure 8:
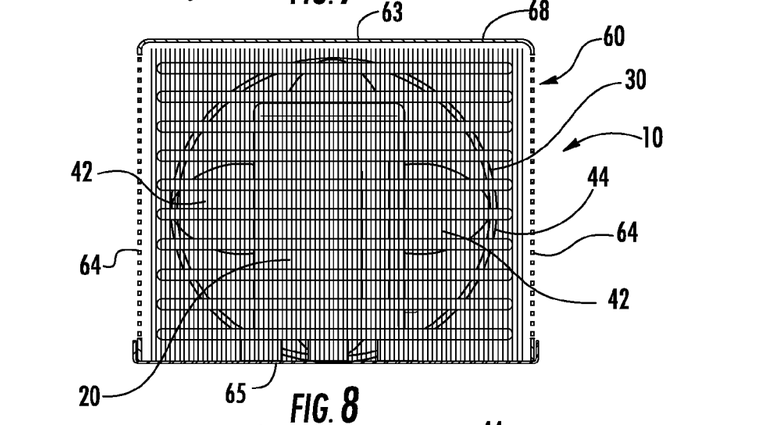
FIG. 8 is a cross-sectional view of the structure shown in FIG. 7, taken along section lines VIII-VIII of FIG. 7.
Figure 9:
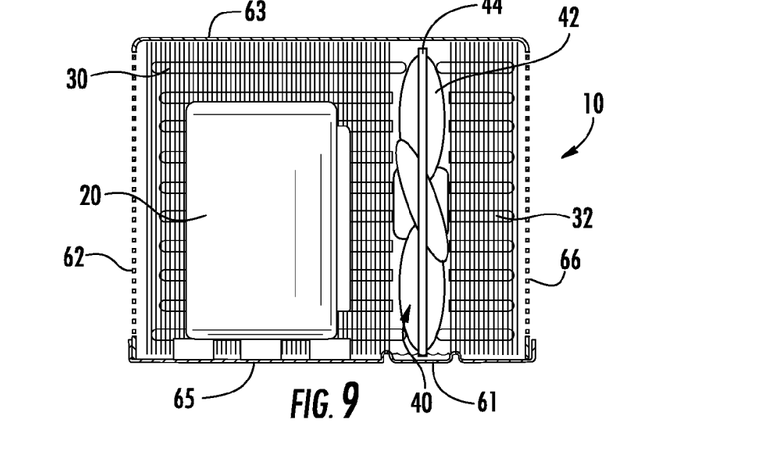
FIG. 9 is a cross-sectional view of the structure shown in FIGS. 7 and 8, taken along section line IX-IX in FIG. 7.

In a third embodiment of the invention shown in FIGS. 7-9, a generally rectangular cabinet 60 is provided with an air inlet grill 62 along one side, allowing the inflow of air in the direction of arrow A, as well as grills 64 on the opposite side walls, which allow air intake in the direction indicated by arrows B. Air is drawn in by a fan assembly 40, as in the previous embodiments, which includes a motorized fan with fan blades 42 coupled to a centrally located motor hub. The fan assembly moves the air in a horizontal direction between the enclosed top 63 and enclosed floor 65 of cabinet 60. The fan assembly 40 includes a surrounding outer rim 44 which, as in the previous embodiments, dips into a tray 61 (FIG. 9) in enclosed floor 65 for dispersing the water in droplets 46 into the airstream against a second condenser 32. A first condenser 30 is generally U-shaped in top view, as seen in FIG. 7, and surrounds the three inlet air sides of the cabinet 60. Air is exhausted through the secondary condenser 32, as indicated by arrows C, flowing through the open grillwork of the cabinet, which includes suitable sheet metal structural framework to support the grills, allowing airflow through the cabinet 60. In this embodiment, the air is drawn in in a horizontal direction, and particularly airflow indicated by arrows A, provides supplemental cooling for the compressor to increase its efficiency.

Figure 10:
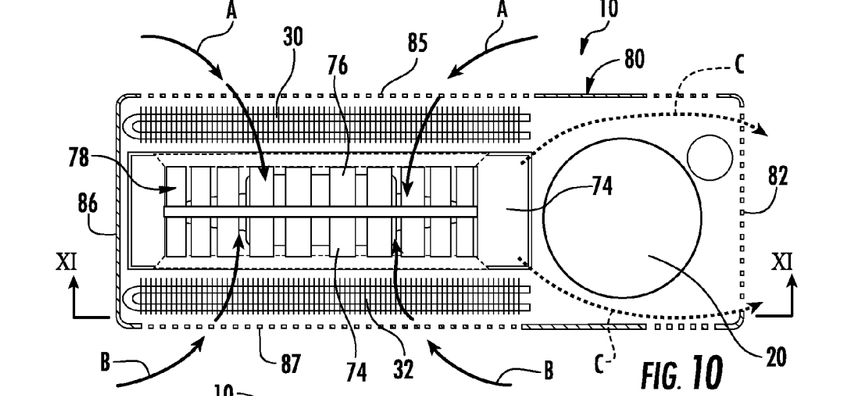
FIG. 10 is a top plan schematic view of another alternative embodiment of the present invention.
Figure 11:
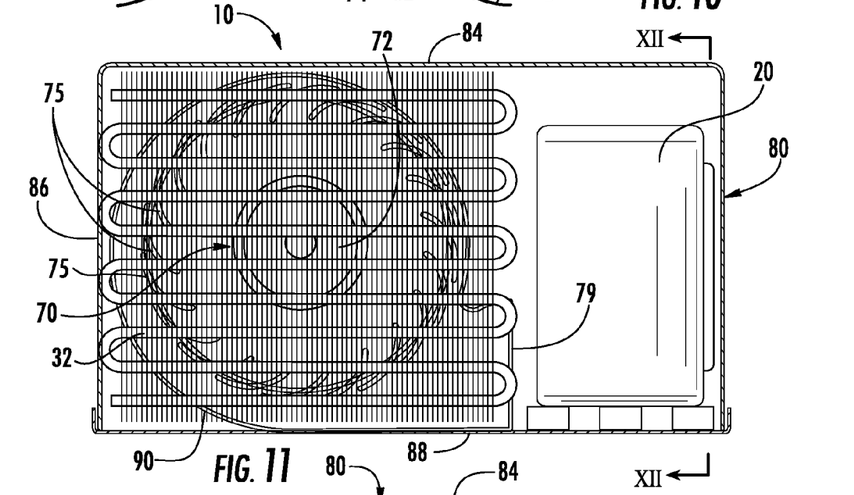
FIG. 11 is a cross-sectional view of the structure shown in FIG. 10, taken along section line XI-XI.
Figure 12:
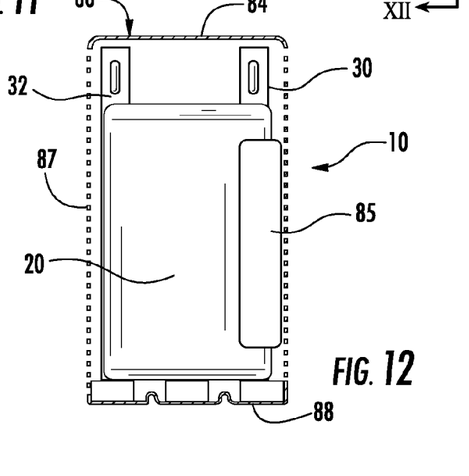
FIG. 12 is a cross-sectional view of the structure shown in FIGS. 10 and 11, taken along section lines XII-XII.

Another embodiment is shown in FIGS. 10-12 and also utilizes horizontal air movement for an ODU 10 and includes, instead of a conventional bladed fan, a centrifugal fan or squirrel cage type blower 70 with a centrally located motor 72 which is coupled to dual wheels 74 and 76 (FIG. 10). This design results in somewhat quieter operation and one in which all of the discharge air from the blower is directed onto the compressor 20. The blower impeller 78 has internal blades 75, which draw air in through opposite side grills 85, 87 and exhausts them through the open end 79 of the blower housing 90 over compressor 20 and out through grill 82 of cabinet 80, which has a solid top wall 84, rear wall 86, and floor 88. The impeller 78 is housed in an enclosed cylindrical tangentially extending sheet metal housing 90 which surrounds the outer periphery of the impeller 78 and parts of the side leaving a central opening on each side to allow the blades 75 of the impeller-type centrifugal blower to draw air in through the grills 85 and 87 on opposite sides of cabinet 80 in the direction indicated by arrows A on one side and arrow B on the opposite side. The cooling air is drawn through the parallel coupled condensers 30, 32 and exhausted, as indicated by arrow C, around the compressor 20 and through grill 82. Cabinet 80 also includes an integral floor 88 and suitable structural framework to support the components of the system.

Figures 13, 14:
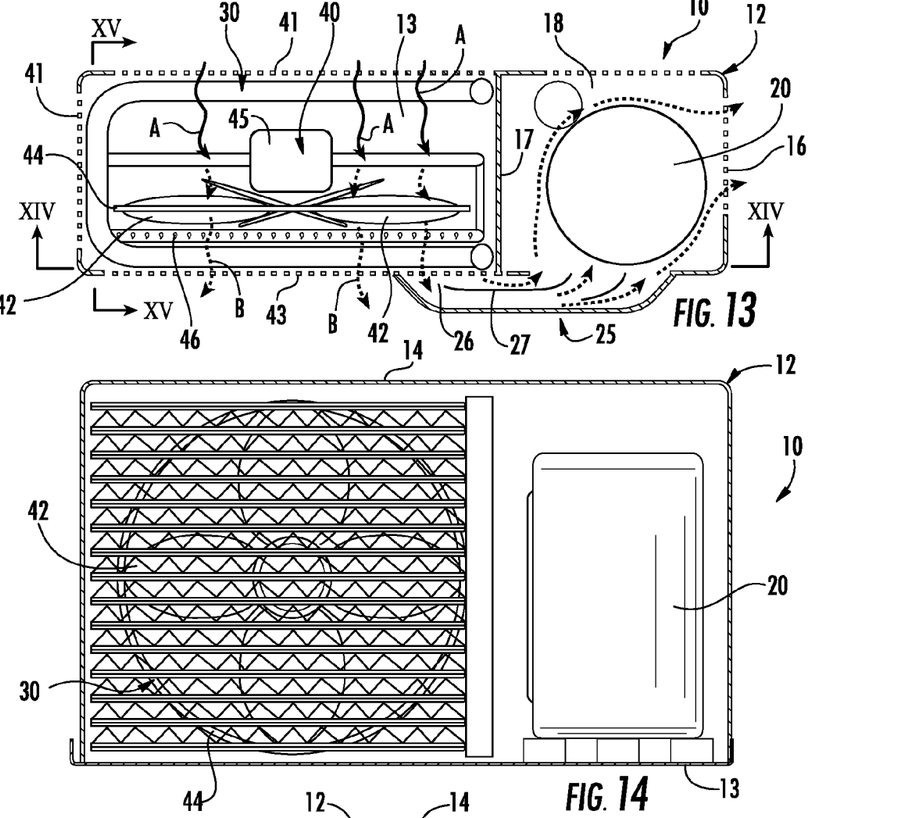
FIG. 13 is a top schematic view of another embodiment of the invention.
FIG. 14 is a cross-sectional view of the structure shown in FIG. 13, taken along section line XIV-XIV of FIG. 13.
Figure 15:
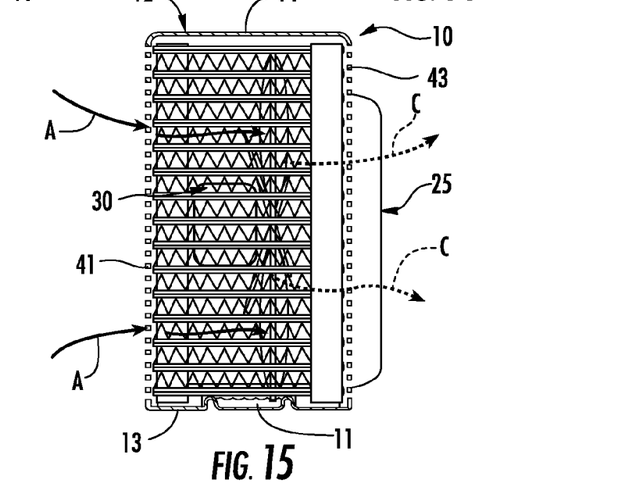
FIG. 15 is a cross-sectional view of the structure shown in FIGS. 13 and 14, taken along section line XV-XV of FIG. 13.

Another embodiment of the invention is shown in FIGS. 13-15 and employs a cabinet 12 for the ODU 10 shown therein which is somewhat similar to that shown in the first embodiment of FIGS. 1-3. The unit, however, employ a single U-shaped condenser 30 conventionally coupled to the compressor 20. Cabinet 12 of FIGS. 13-15 includes a solid top wall 14 and additionally includes air inlet grills 41 on the end and one side and air discharge grill 43 on an opposite side to exhaust air driven by fan assembly 40. The cabinet 12 is divided into a condenser compartment 13 and a compressor compartment 18 by a dividing partition 17. Assembly 40 includes (as in the other embodiments) an electrical drive motor 45 for rotary fan blades 42. As in the first embodiment, the fan assembly 40 includes a rim 44 which dips into a water tray 11 in floor 13 to provide cooling water droplets 46 for the section of condenser 30 adjacent discharge grill 43.

As in the first embodiment shown in FIGS. 1-3, the input air, as represented by arrows A, is drawn in through inlet air grill 41 by fan assembly 40 and discharged in a direction indicated by arrow B through the finned condenser coil 30. An air deflecting baffle 25 is formed with the cabinet 12 and defines an air plenum 27 with an open mouth 26 which partially extends over the discharge grill 43 of the cabinet 12. Thus, at least a partial amount of the airflow through the condenser 30 is diverted by the baffle 25, as indicated by arrows C, into the condenser chamber 18. The air then flows around the compressor 20, as illustrated by arrows C, to provide supplemental cooling for the compressor 20.

In the embodiment shown, the baffle 25 extends vertically between the top and bottom of the cabinet 12, as seen in FIG. 15, and overlies and scoops air from approximately 25% of the discharge grill 43 of the ODU. Although the air exiting the second finned condenser coil 32 is heated, it is significantly cooler than the outer surface of compressor 20. By diverting a portion of the airflow indicated by arrows C in the figures into the compressor chamber 18, significant additional cooling to the compressor 20 is provided, resulting in an increased efficiency. This allows a smaller and less expensive ODU 10 to be employed at an installation due to the improved efficiency.

Figure 16:
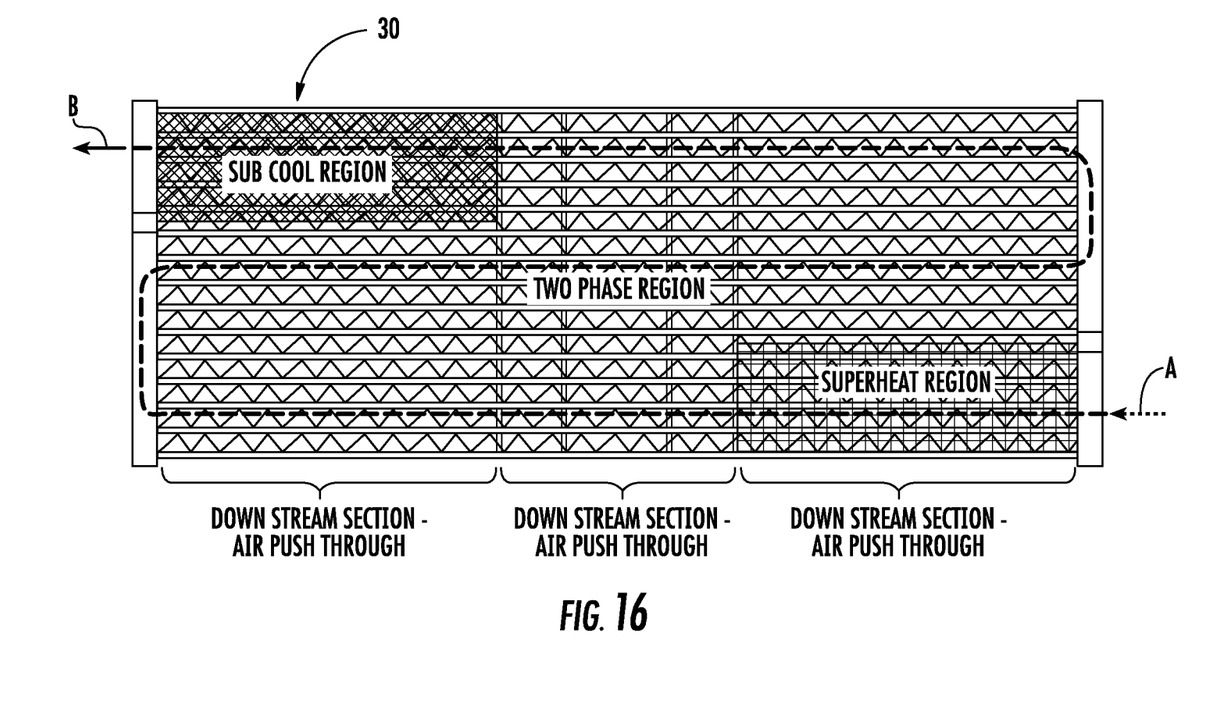
FIG. 16 is a phase diagram of refrigerant passing through the condenser employed in the FIGS. 13-15 embodiment.

FIG. 16 is a state diagram of the refrigerant flowing through any one of the single or dual condensers shown in the various embodiments described in this application. In the diagram, a condenser 30 is shown in relation to the flow of refrigerant therethrough. Refrigerant from the compressor enters the condenser in a direction indicated by arrow A in FIG. 16 in a portion of the condenser which is at the discharge grill side where the condenser is formed in two sections or, in the case of a single condenser, such as shown in FIGS. 13-15, near discharge grill 43. As refrigerant passes through the single or two-stage condensers, it tends to cool from the superheated region in the area of the condenser(s) labeled superheat region in FIG. 16. The refrigerant passes through the center area of the condenser in a two-phase region downstream from the superheat region. In this area of the condenser, the hot gases are cooled to a gas/liquid phase mixture. Subsequently, the refrigerant enters the sub cool region, so labeled in the diagram of FIG. 16, where the gas is condensed to a liquid exiting the condenser as indicated by arrow B on its way to the evaporator. Condenser(s) 30 is arranged in the cabinet of each of the embodiments such that the initial input air flows through the sub cool region first and exits through the super heat region in each of the embodiments to most efficiently convert the high pressurized heated gas into a liquid form with maximum energy transfer between the condenser(s) and air forced through the condenser(s) by the fan assembly and blower assemblies of this invention.

Figure 17:
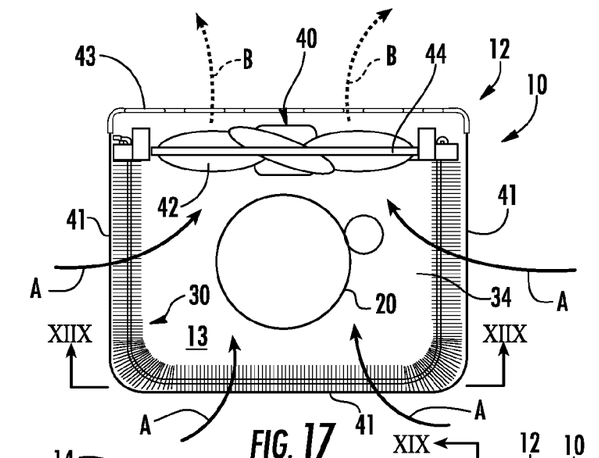
FIG. 17 is a top plan schematic view of another embodiment of the present invention.
Figure 18:
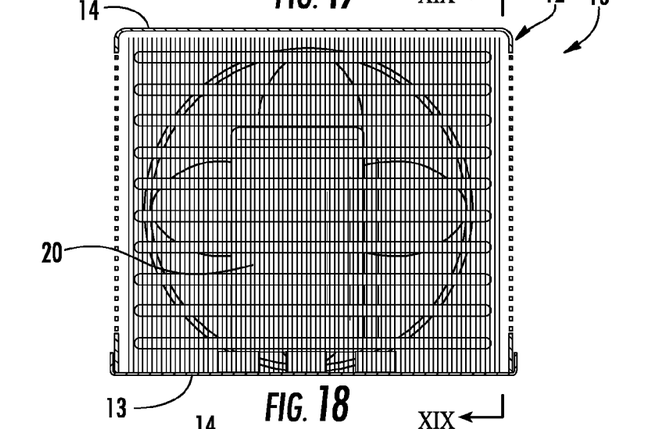
FIG. 18 is a cross-sectional view of the structure shown in FIG. 17, taken along section line XVIII-XVIII of FIG. 17.
Figure 19:
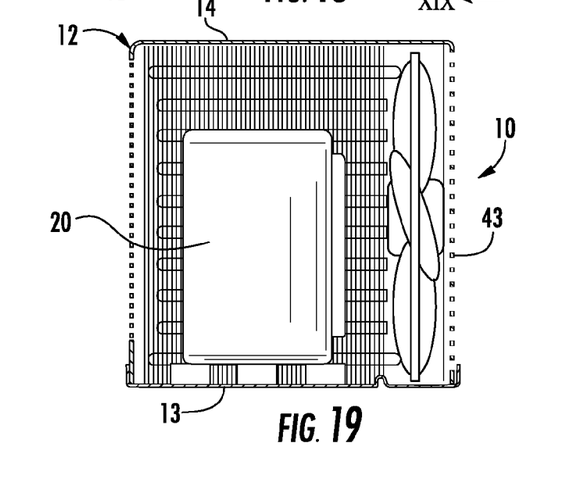
FIG. 19 is a cross-sectional view of the structure shown in FIGS. 17 and 18, taken along section lines XIX-XIX in FIG. 17.

Another embodiment of the invention is shown in FIGS. 17-19, which shows a modified barrel-type ODU 10 in which the fan assembly is oriented in a vertical plane as opposed to the typical horizontal mounting found in most conventional air conditioning units. The cabinet 12 includes three inlet sides with inlet grills 41 for drawing air into the unit in the direction indicated by arrows A in FIG. 17. The single piece condenser 30 extends around the three sides of the cabinet 12 to receive the input air through conventional grillwork, allowing air drawn in by fan assembly 40 to cool the center located compressor 20. The cabinet 12 also supports an air discharge grill 43 adjacent the fan assembly 40 with blades 42. The fan assembly may or may not include an outer rim 44 for the blades 42.

In this embodiment with the fan mounted in a vertical plan, air is drawn uniformly from top to bottom as viewed the side and end views of the unit to surround the compressor 20 with cooling air subsequent to entry within the interior compartment 34 (FIG. 17) of the cabinet. Cabinet 12 has an enclosed floor 13 and an enclosed top 14. With the enclosed floor 13 and top 14, the airflow from inlet grills 41 surrounds the entire height of compressor 20, providing cooling as the air exits the unit, as shown by arrows B in FIG. 17.

Figure 20:
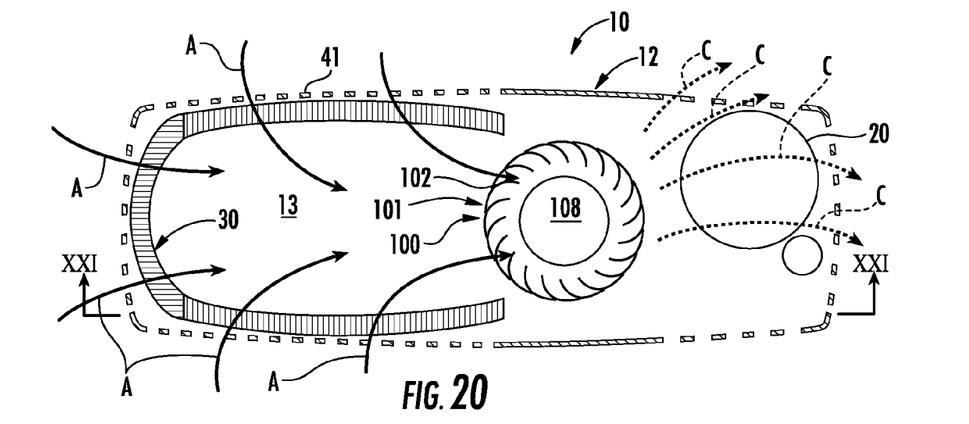
FIG. 20 is a top plan view of yet another embodiment of the present invention.
Figure 21:
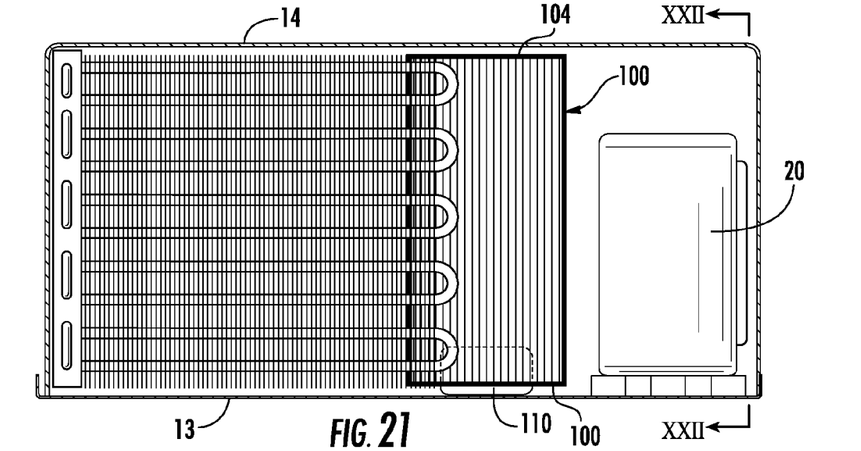
FIG. 21 is a cross-sectional view of the structure shown in FIG. 20, taken along section line XXI-XXI of FIG. 20.
Figure 22:
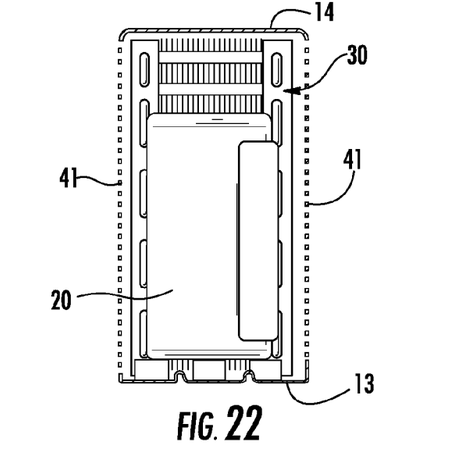
FIG. 22 is a cross-sectional view of the structure shown in FIGS. 20 and 21, taken along section line XXII-XXII of FIG. 21.

FIGS. 20-22 show another embodiment of the present invention in which the ODU 10 includes a vertically mounted cross flow or transverse tangential fan assembly 100 mounted on a vertically oriented axle 108. The fan assembly 100 includes a cross flow fan 101 with blades 102 mounted between circular upper and lower end plates 104, 106. Central axle 108 is vertically oriented and coupled to the end plates 104, 106 and to a drive motor 110 for rotating the blower in a counterclockwise direction, as seen in FIG. 20, to draw air inwardly through air inlet grills 41 in the cabinet 12 of the ODU 10 and discharge the air outwardly around compressor 20 in a direction indicated by arrows C in FIG. 20. Cabinet 12 includes an enclosed top 14 and lower enclosed floor 13. The condenser 30 is a generally U-shaped single piece unit which extends toward fan 100 to slightly overlap the fan, as seen in FIGS. 20 and 21.

Figure 23:
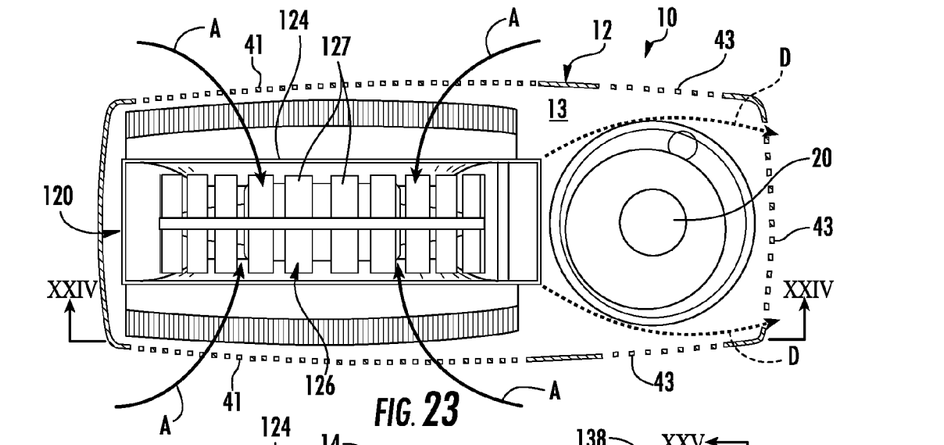
FIG. 23 is a top plan schematic view of the heat pump embodiment of the present invention.
Figures 24, 25, 26, 27, 28:
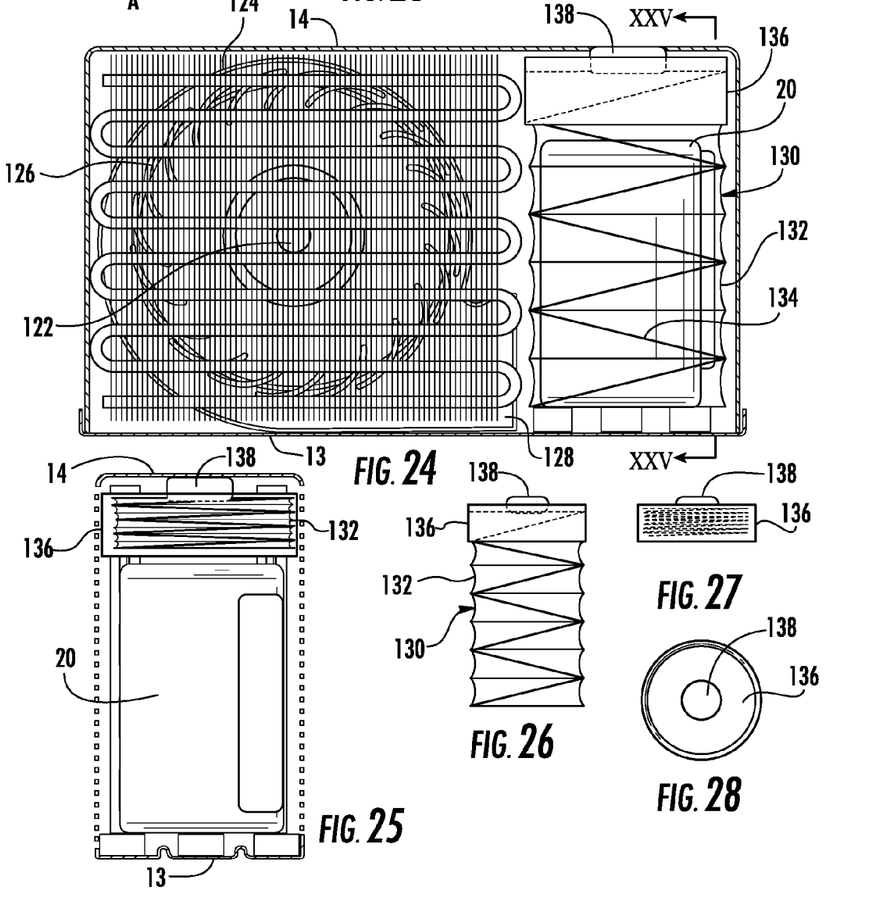
FIG. 24 is a cross-sectional view of the structure shown in FIG. 23, taken along section line XXIV-XXIV of FIG. 23.
FIG. 25 is a cross-sectional view of the structure shown in FIGS. 23 and 24, taken along section line XXV-XXV in FIG. 24.
FIG. 26 is a front elevational view of the compressor sleeve shown in FIGS. 23-25, shown in an expanded position.
FIG. 27 is a front elevational view of the compressor sleeve shown in a compressed position.
FIG. 28 is a top plan view of the compressor sleeve shown in FIG. 26.

FIGS. 23-28 disclose an embodiment of the invention which is used in a heat pump environment where, during the cooling mode of operation, it is desired to provide supplemental airflow for cooling the compressor. When in a heating mode where heat is being extracted from a thermal source, such as the ambient air or an underground water tank, it is desired to maintain the residual heat provided by the compressor. In this embodiment, the ODU 10 includes a cabinet 12, which houses a dual horizontally mounted squirrel cage blower 120 driven by a centrally located motor 122 and having a cylindrical housing 124 surrounding the squirrel cage rotor 126 having vanes 127 extending around the periphery thereof, as best seen in FIGS. 23 and 24. The rotor 126 rotates in a counterclockwise direction, as seen in FIG. 24, discharging air through the discharge chute 128 of surrounding housing 124 and toward the compressor 20.

A movable compressor enshrouding sleeve assembly 130 is positioned above and coaxially aligned with the generally cylindrical compressor 20 to surround and enclose the compressor, as seen in FIGS. 24 and 26, when lowered. This basically enshrouds the compressor, preventing air from blower assembly 120 from providing supplemental cooling the compressor 20. The bellows-type sleeve assembly includes an outer skin 132 which is supported by a spiral spring wire 134 to maintain its expanded shape, as best seen in FIG. 24. The sleeve can be retracted into a housing 136 utilizing a suitable drive unit 138, which acts upon either the skin 132 or the wire reinforcement 134 or both to retract the sleeve 130 into the housing 136, as shown in FIGS. 25 and 27. As in prior embodiments, the cabinet 12 includes air inlet grills 41, air discharge grills 43, an enclosed top 14, and enclosed floor 13. For retracting and extending the skin 132, sleeve 130 may include a belt drive type system in which a gear tape extends along the length of the extended sleeve, as shown in an extended position in FIG. 26, and extends into a gear-driven motor in drive unit 138 which can extend and retract the semi-rigid belt to extend the sleeve skin 132 as seen in FIG. 26 or retract the same into the housing 136 as illustrated in FIGS. 25 and 27. Other drive arrangements for extending and retracting the sleeve likewise could be employed.

Figure 29:
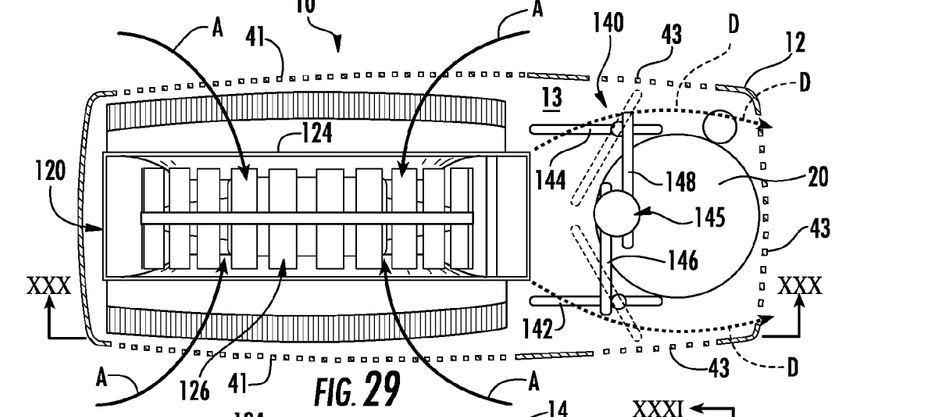
FIG. 29 is a top plan schematic view of an alternative embodiment of the heat pump system.
Figure 30:
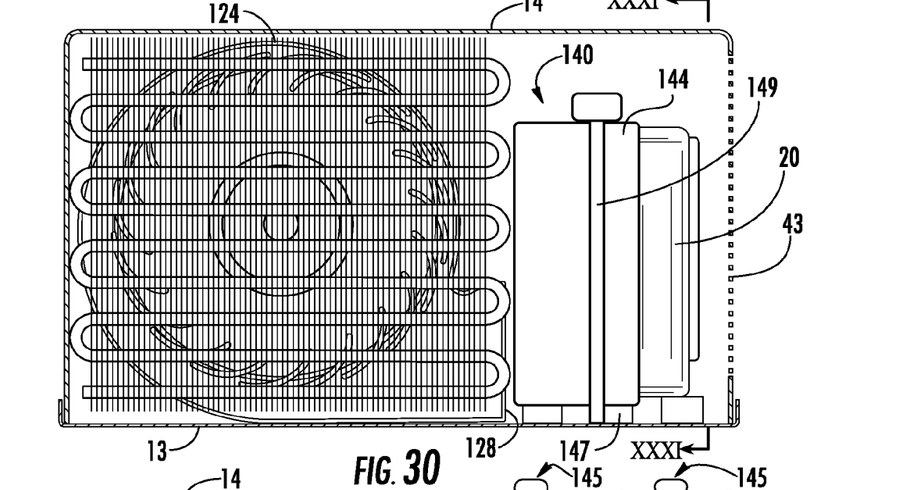
FIG. 30 is a cross-sectional view of the structure shown in FIG. 29, taken along section line XXX-XXX in FIG. 29.
Figure 31:
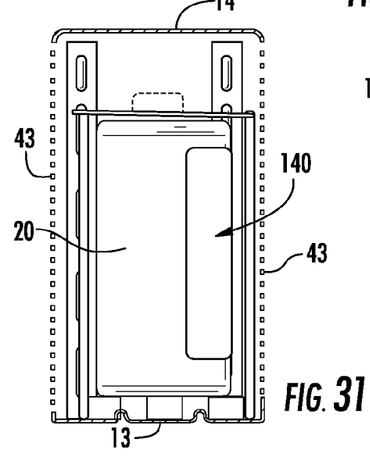
FIG. 31 is a cross-sectional view of the structure shown in FIGS. 29 and 30, taken along section line XXXI-XXXI of FIG. 30.
Figures 32, 33:
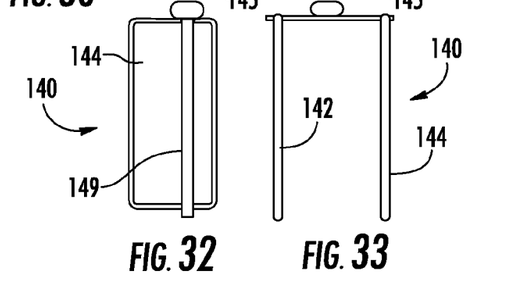
FIG. 32 is a side elevational view of the shutter structure shown in FIGS. 29-31.
FIG. 33 is a right-side elevational view of the structure shown in FIG. 32, shown with the vanes in an open position.
Figure 34:
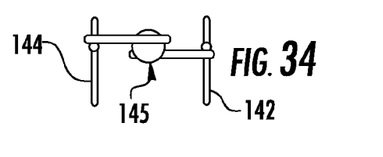
FIG. 34 is a top plan view of the structure seen in FIG. 33.

FIGS. 29-34 illustrate another embodiment of a heat pump type system which can divert cooling air when operated in a heat pump mode from the compressor 20 shown in the figures utilizing a movable vane assembly 140. The cabinet 12 and blower assembly 120 of this embodiment is the same as that described in connection with FIGS. 23-25 and similar components carry the same reference numerals. Instead of using a collapsible sleeve as in the prior embodiment, this embodiment employs vertically movable vanes in a movable vane assembly 140 positioned upstream of the airflow from the compressor 20, as best seen in FIG. 29. The vane assembly comprises a pair of vertically extending, generally rectangular vanes 142, 144, which are pivotally mounted to arms 146, 148 of a Bell crank assembly 145 driven by a motor 147 coupled by vertical shaft 149 to the Bell crank assembly 145. Actuation of motor 147 by the furnace/air conditioner control system either opens the vanes 142, 144, as shown in solid lines in FIG. 29 (and in FIGS. 31-34), or closes them, as shown in phantom lines in FIG. 29, during a heat mode of operation to divert the flow of air around the compressor 20, as illustrated by arrows D in FIG. 29.

Figure 35:
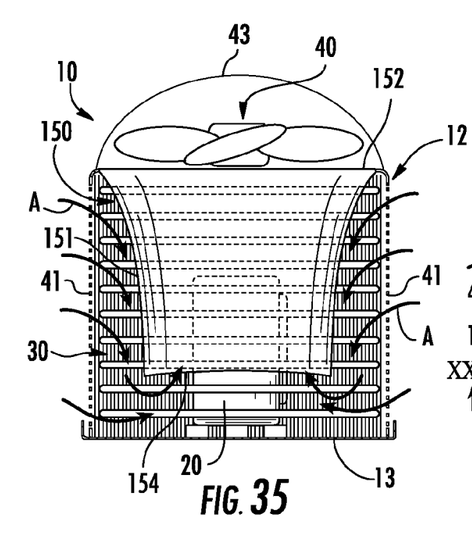
FIG. 35 is schematic front elevational view of an alternate embodiment showing baffle structure for diverting the flow of air in an air conditioner.
Figure 36:
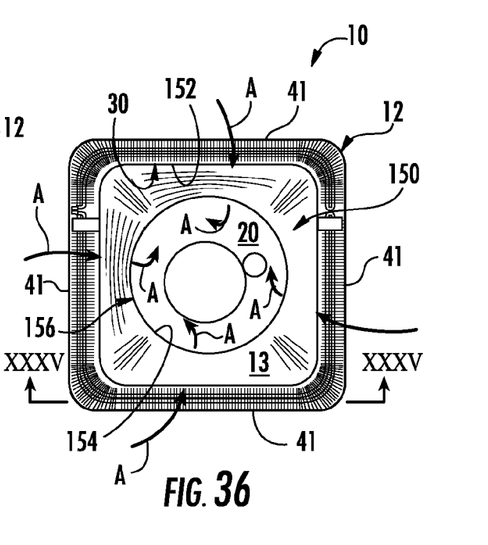
FIG. 36 is a top plan view of the structure shown in FIG. 35.

FIGS. 35 and 36 disclose an alternative embodiment of the invention in which a curvilinear frustoconical baffle is employed in an otherwise conventional barrel-type ODU to provide condenser cooling by directing the condenser cooling airflow uniformly over the condenser surface and also provide supplemental cooling of the compressor in the cabinet. In FIGS. 35 and 36, an ODU 10 is shown as including a cabinet 12 having air inlet grills 41 on all four sides of the generally square cabinet structure. The cabinet includes a generally rectangular condenser 30 mounted within the cabinet 12, which has a sealed floor 13 and conventional corner structures for supporting the condenser 30. The top 14 of the cabinet is open. A fan assembly 40 is supported by the corner supports of cabinet 12 by suitable cross struts in a conventional manner. Air flow entering grill 41, as shown by arrows A in the figures, is diverted downwardly by the curvilinear frustoconical baffle 150, which extends downwardly from the top of cabinet 12 substantially three-quarters the height of the cabinet 12. Baffle 150 has a square open mouth 152 near the fan assembly 40. The smaller lower edge 154 of the curvilinear sides of the frustoconical baffle 150 is generally circular, as best seen in FIG. 36, and is positioned in coaxial relationship to the compressor 20. The ambient air entering the central area of the barrel-type air conditioner ODU is deflected downwardly along the curved outer side walls 151 of baffle 150 and, subsequently, is drawn upwardly into the open lower end 154 around the lower peripheral edge, as indicated by arrows A in FIG. 35. Subsequently, the air travels upwardly within the inner area 156 of the baffle 150, as seen by arrows A in FIG. 30. The air is then discharged outwardly through the discharge grill 43 above the fan assembly 40. Baffle 150 is supported by the structural corner members of the cabinet 12 utilizing brackets or cross braces in a conventional manner.

Figure 37:
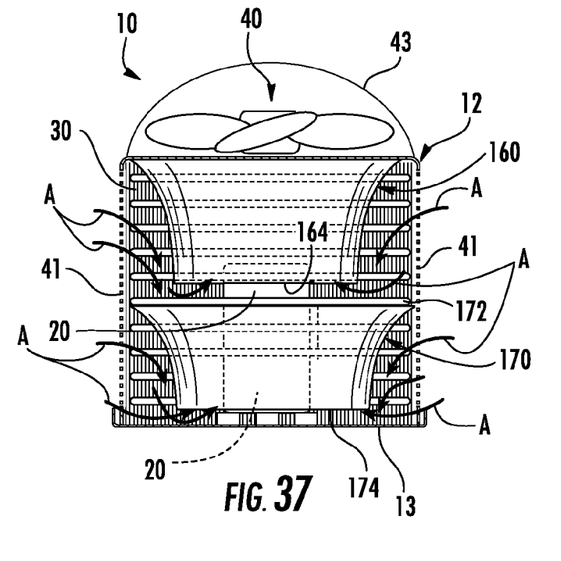
FIG. 37 is a side elevational view of an alternative embodiment of the structure shown in FIG. 35, employing a pair of baffles.

In an alternative embodiment of the invention as shown schematically in FIG. 37, a pair of curvilinear frustoconical baffles 160, 170 are vertically stacked in spaced relationship to provide dual funneling of air entering inlet grills 41 and forced outwardly through discharge grill 43 by fan assembly 40. In this embodiment, the curvilinear frustoconical baffle 160 is positioned near the top and has a similar construction to that of baffle 150, only somewhat shorter. Baffle 160 is mounted so as to extend from the top to nearly half way toward the enclosed bottom 13 of the cabinet 12 of the ODU 10. Baffles 160, 170 can be supported, as can be fan assembly 40, utilizing conventional cross braces and brackets for positioning the baffles in cabinet 12. Baffle 160 is also coaxially aligned with the compressor 20 and is vertically spaced above a second curvilinear frustoconical baffle 170, which has an open upper mouth 172 larger in diameter than the lower open mouth 164 of baffle 160. This permits air to enter the vertical gap G between the baffles 160 and 170, as indicated by arrows A, to enter the upper baffle 160. The second baffle 170 is spaced above floor 13 a similar distance to that of gap G so that input air from grills 41 can likewise enter through the lower opening 174 of baffle 170 and flow upwardly adjacent the compressor 20. Thus, in this embodiment, by using two curvilinear frustoconical baffles located at upper and lower spaced-apart positions in the cabinet 12, the compressor 20 receives cooling air near the bottom of the compressor as well as near the top. The vertically stacked baffles 160 and 170 complement one another by somewhat increasing the velocity of air immediately adjacent compressor 20 while not interfering with the airflow through the condenser 30.

Figure 38:
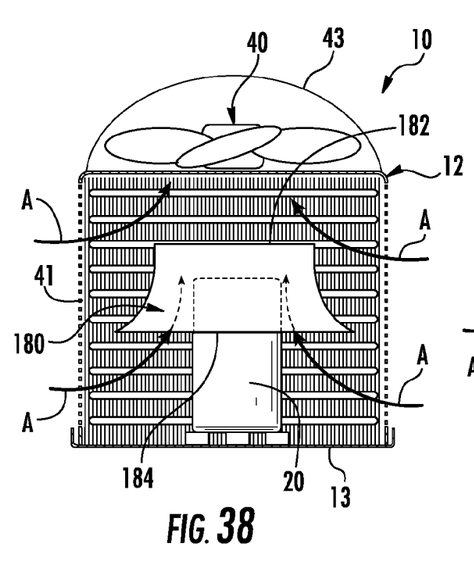
FIG. 38 is a side elevational view of an alternative embodiment of the baffle structure shown in FIGS. 35 and 37.
Figure 39:
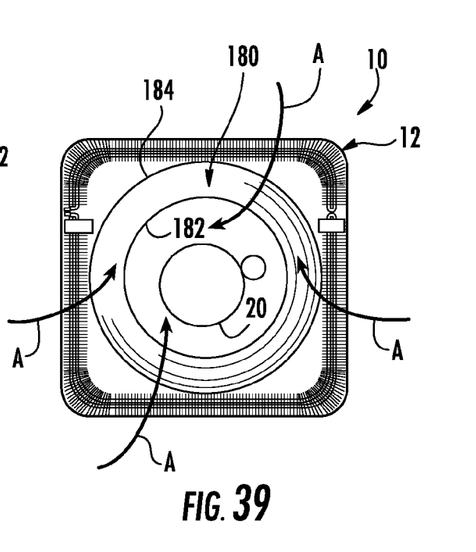
FIG. 39 is a top plan view of the structure shown in FIG. 38.

In yet a further embodiment of the invention as shown in FIGS. 38 and 39, a barrel-type ODU 10 of generally square cross section is again provided with a curvilinear frustoconical baffle 180 which is vertically centrally located in the cabinet 12 of the ODU 10. The baffle 180 has a generally circular upper opening 182 and a generally circular larger diameter lower opening 184 and serves to funnel air in the direction indicated by the lower arrows A in FIG. 38 adjacent the upper portion of the upper section of compressor 20 which is the hottest area of the compressor. The single curvilinear frustoconical baffle 180 can be supported, as can be fan assembly 40, utilizing conventional cross braces and brackets for positioning the baffle in cabinet 12, as seen in FIGS. 38 and 39.

Thus, with all of the embodiments of the present invention, air can be selectively diverted from the input and/or discharge stream of cooling air for the condenser into the area occupied by the compressor to add additional cooling airflow to the compressor. In the heat pump embodiments of the invention, this diverted air can be selectively blocked from the compressor when in a heating mode.

Those skilled in the art will recognize, or be able to ascertain using no more than routine experimentation, many equivalents to the specific aspects of the disclosure described herein. Such equivalents are intended to be encompassed by the following claims.

The disclosure claimed is:

1. An outdoor unit for an air conditioner system, the outdoor unit comprising:
   a cabinet having an enclosed top and bottom and partitioned into a compressor compartment and a condenser compartment, the cabinet including airflow grills in the compressor compartment and the condenser compartment of the outdoor unit;
   a fan for drawing air through one of the airflow grills in the condenser compartment for cooling a condenser; and
   a baffle positioned between the compressor compartment and the condenser compartment and projecting outwardly from the compressor compartment and condenser compartment of the cabinet for directing airflow from at least a part of an exhaust air from the condenser compartment into the compressor compartment to flow around a compressor positioned in the compressor compartment; the baffle overlies one of the airflow grills in the condenser compartment and connects to the compressor compartment;
   the airflow grills in the condenser compartment include an air inlet grill and an air discharge grill, and wherein the baffle receives air from the air discharge grill in the condenser compartment at an open mouth portion of the baffle;

wherein the baffle extends along a longest dimension of the cabinet, and wherein the cabinet in the longest dimension is longer than the baffle.

2. The outdoor unit for an air conditioner system of claim 1, wherein the baffle includes an air plenum which has an open mouth and the baffle overlies the air discharge grill of the condenser compartment and scoops air from the air discharge grill into an air inlet grill in the compressor compartment.

3. The outdoor unit for an air conditioner system of claim 1, wherein the airflow grills in the compressor compartment includes a plurality of air discharge grills for discharging air flowing around the compressor and received from the baffle.

4. The outdoor unit for an air conditioner system of claim 3, wherein the condenser compartment has opposed airflow grills on opposite side walls of the cabinet.

5. The outdoor unit for an air conditioner system of claim 4, wherein the condenser has sections positioned adjacent each of the opposed airflow grills on opposite sides of the cabinet.

6. The outdoor unit for an air conditioner system of claim 1, wherein the fan includes a circumferential outer rim and the cabinet includes a water tray in contact with the circumferential outer rim of the fan to provide water sling cooling to the condenser.

7. The outdoor unit for an air conditioner system of claim 1, wherein the cabinet is integrally formed.

8. The outdoor unit for an air conditioner system of claim 1, wherein the fan assembly is positioned in spaced relationship to the air discharge grill, and a fan assembly is positioned in the cabinet between the air discharge grill and the condenser, wherein the fan assembly moves air from the inlet grill around the compressor to the air discharge grill.

9. The outdoor unit for an air conditioner system of claim 1, wherein the condenser has a section extending adjacent the discharge grill and wherein the fan assembly is positioned adjacent the section of the condenser adjacent the discharge grill.

10. The outdoor unit for an air conditioner system of claim 9, wherein the fan assembly includes a circumferential outer rim and the cabinet includes a water tray in contact with the circumferential outer rim of the fan assembly to provide water sling cooling to the condenser.

11. An outdoor unit for an air conditioner system, the outdoor unit comprising:

a cabinet with enclosed top and bottom panels, the cabinet having an air inlet grill and an air discharge grills in spaced-apart relationship on sides of the cabinet; the air inlet grills being within a condenser compartment; the air discharge grill being within the condenser compartment, and at least one air discharge grill being within a compressor compartment of the outdoor unit;

a fan assembly mounted in the condenser compartment of the cabinet for moving air from the air inlet grill to the air discharge grill of the compressor compartment; and wherein the fan includes an outer rim and the cabinet includes a water tray in contact with the outer rim of the fan assembly to provide water sling cooling to the compressor; and a condenser positioned adjacent the air inlet grill and a compressor positioned in the cabinet, such that air movement from the fan assembly flowing through the condenser flows around the compressor and is discharged through the air discharge grill in the compressor compartment;

a baffle positioned between the compressor compartment and the condenser compartment and projecting outwardly from the compressor and condenser compartments of the cabinet for directing airflow from at least a part of an exhaust air from the condenser compartment into the compressor compartment to flow around a compressor positioned in the compressor compartment, and wherein the baffle defines an air plenum and receives air from the air discharge grill in the condenser compartment at an open mouth portion of the air plenum of the baffle, and wherein the open mouth portion extends partially over the air discharge grill;

wherein the baffle extends along a longest dimension of the cabinet, and wherein the cabinet in the longest dimension is longer than the baffle.

12. The outdoor unit for an air conditioner system of claim 11, wherein the condenser is between the air inlet grill and the air discharge grill of the condenser compartment.

13. The outdoor unit for an air conditioner system of claim 11, wherein the outer rim is circumferential.

14. The outdoor unit for an air conditioner system of claim 11, wherein the baffle overlies the air discharge grill of the condenser compartment and scoops air from the air discharge grill into the open mouth portion of the air plenum and from the air plenum into an air inlet grill in the compressor compartment.

15. The outdoor unit for an air conditioner system of claim 12, wherein the baffle overlies the air discharge grill of the condenser compartment and connects to the compressor compartment.

16. The outdoor unit for an air conditioner system of claim 14, wherein an air flow through the baffle results in increased efficiency and provides additional cooling to the compressor.

17. The outdoor unit for an air conditioner system of claim 11, wherein the cabinet is integrally formed.

18. The outdoor unit for an air conditioner system of claim 11, further comprising two air discharge grills within the compressor compartment.

19. The outdoor unit for an air conditioner system of claim 11, wherein the fan is vertically oriented.

* * * * *